United States Patent Office 3,344,891
Patented Oct. 3, 1967

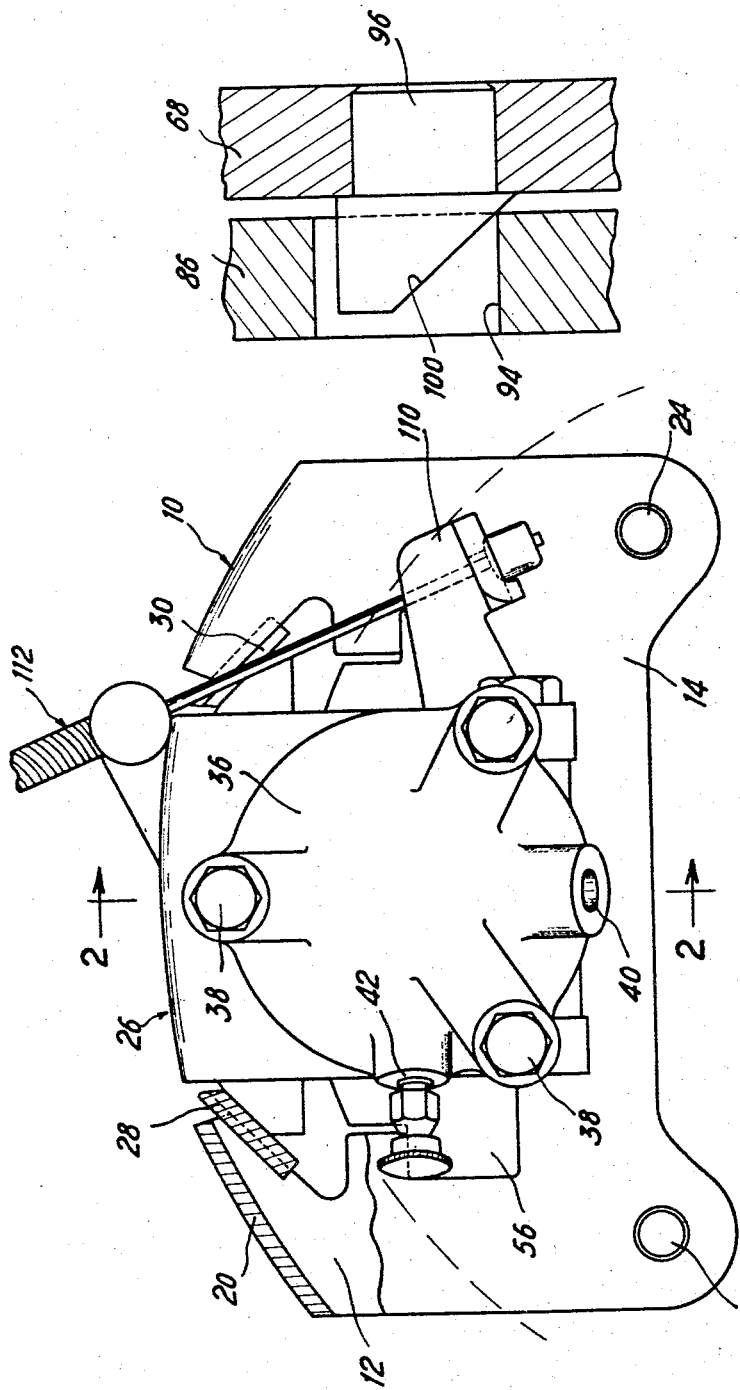

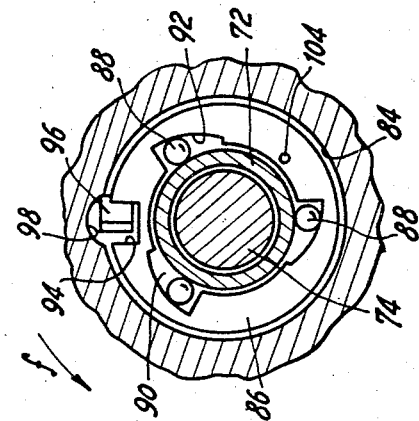
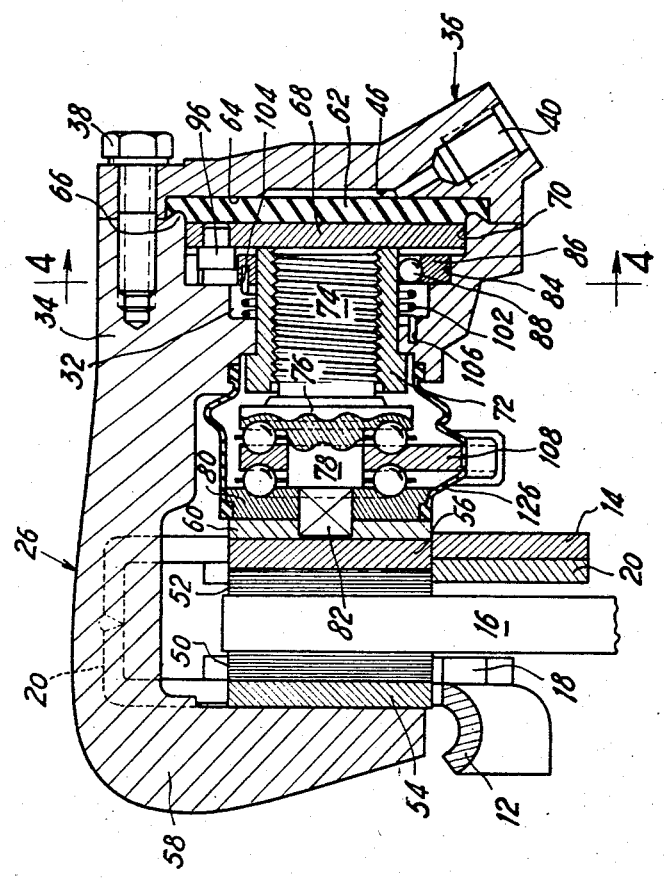

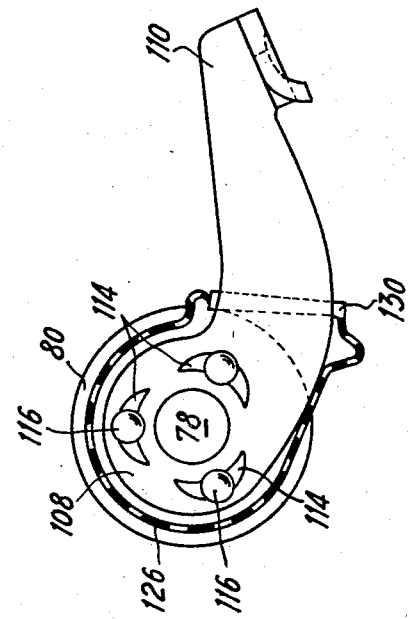
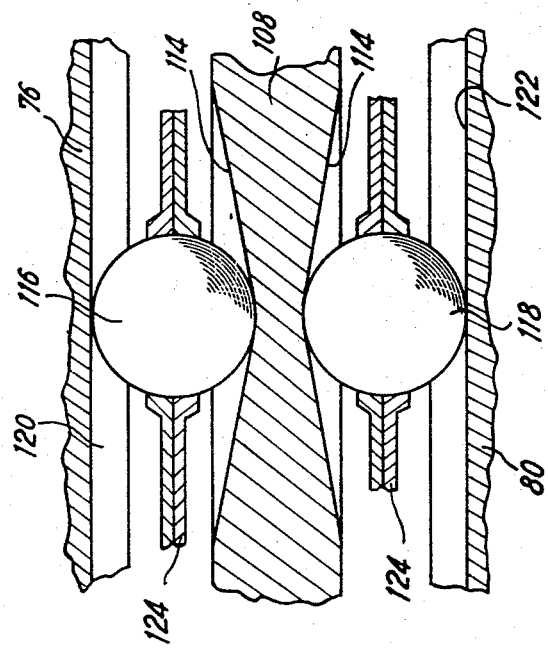

3,344,891
AUTOMATIC BRAKE ADJUSTER FOR DISC BRAKE
Rene Thirion, Paris, France, assignor to
Societe Anonyme D.B.A.
Filed July 8, 1966, Ser. No. 563,926
Claims priority, application France, July 29, 1966,
24,309
7 Claims. (Cl. 188—73)

The present invention has mainly for its object an automatic adjusting means for a disc brake and more particularly for a disc brake with a floating stirrup.

In the conventional disc brakes with hydraulic and mechanical actuation use is made of adjusting means arranged between the piston of the brake motor and the stirrup to provide to the piston a constant stroke whatever be the state of the linings.

It results therefrom on the one hand, particularly when use is being made of thick linings, that it is necessary to reserve a sufficient piston stroke in the motor cylinder as well as a connection member of a sufficient length between the piston and the friction pad, the piston being brought to move in the motor cylinder under the action of the adjusting means in function of the state of the lining wear. The space required for the unit formed by the friction pad, the piston and the motor is thus substantial.

On the other hand, it is necessary to provide a protection cap between the piston and the stirrup in addition to the normal sealing cup provided between the piston and the motor cylinder. This protection cap must have important dimensions radially because of the section of the piston as well as axially because of the displacement of the latter in accordance with the wear of the linings. It is thus necessary to provide a sufficient space to locate said cap so as the latter will be prevented from engaging frictionally the disc while reserving a sufficient piston stroke.

One of the objects of the present invention, is to provide an automatic adjuster of the screw-and-nut type arranged in such a manner between the piston of the brake motor and the adjacent friction pad that the volume of the control chamber of the brake motor remains constant whatever be the state of wear of the linings. Such a construction brake enables a reduction of the control chamber to a minimum volume, the piston having however a substantial cross-section.

Another object of the invention is to provide an automatic adjusting device including a screw prevented from rotation and interconnected with one of the friction pads, said screw cooperating by means of an irreversible helical connection with a movable sleeve taking abutment on the piston of the motor provided in the stirrup, the said sleeve being urged in rotation upon release of the brake by a yielding connection which determines the advance of the screw for a value corresponding to the wear of the linings.

Another object of the invention is to provide a freewheel coupling formed by a set of balls located between the movable sleeve of the adjusting device and a cage biased in rotation by a preloaded torsion spring located between the latter and the stirrup in a direction corresponding to the engagement of the free-wheel, the sleeve being thus brought into rotation on the screw to determine the advance of the latter.

The piston of the motor is advantageously formed with a projection provided with an inclined ramp which cooperates with a hole formed on the cage of the free-wheel in order to bias said cage into rotation upon actuation of the brake into a direction opposite to that in which said cage is biased by the spring, which direction corresponds to disengagement of the free-wheel cage, the said projection being retracted upon release of the brake to enable a rotation of the cage under the action of the torsion spring.

Another aspect of the invention is to provide between the screw and the adjacent friction pad, a hand brake adapted to increase the axial distance between these two members. This hand brake comprises a lever interconnected with an annular element formed on each of its faces with biconical recesses in which are engaged respectively two sets of balls arranged in grooves respectively provided on an element interconnected with the friction pad and on a collar connected to the screw in such a manner that under the manual action of the lever, said balls under the effect of the biconical ramps cause a movement of the piston which results in disengagement of the piston away from the said screw.

Still another object of the invention, is to provide a brake motor equipped with a diaphragm which under the action of the control pressure acts onto a piston forming plate to cause the axial displacement of the latter.

Other objects and their attendant advantages will become apparent as the following detailed description is read in conjunction with the accompanying drawings wherein:

FIGURE 1 is a rear view, partly broken away, of the support of a disc brake with floating stirrup.

FIGURE 2 is a cross-sectional view taken on the line 2—2 of the disc brake of FIGURE 1 showing the automatic adjusting device of the invention.

FIGURE 3 is an enlarged cross-sectional view of the projection provided with an inclined ramp shown in FIGURE 2.

FIGURE 4 is a cross-sectional view, taken along line 4—4, of the free-wheel of the automatic adjusting device shown in FIGURE 2.

FIGURE 5 is a view showing a detail of the hand brake assembly, and

FIGURE 6 is a partial cross-sectional view showing the mounting of the balls in the biconical recesses provided in the annular member of the hand brake when the latter is in its released condition.

As shown in FIGURES 1 and 2, the disc brake of the invention comprises a fixed support 10 having a U-shape, the two arms 12 and 14 of which are located on the respective sides of a disc 16 connected to the wheel of the vehicle. Reinforcing plates 18 and 20 are maintained between the arms 12 and 14, by means of welds for instance. The two arms 12 and 14 are connected by welding to form a transversal portion 20 constituting a cross-member. Arm 14 comprises bores, such as 24, permitting the support to be affixed on a part of the vehicle. A floating stirrup, generally designated by reference 26, is located straddlewise on disc 16; said floating stirrup is adapted to reciprocate in a suitable recess provided in support 10 through the intermediary of pins 28, 30 located at right angles with respect to the disc, between the stirrup and the arms 12 and 14 of the support respectively.

A stepped bore 32, the axis of which is substantially at right tangles with respect of the disc is provided in portion 34 of stirrup 26 located at the right side of the disc as viewed in FIGURE 2. A cap member 36 is affixed to the stirrup 26 by means of bolts such as 38 and constitutes the bottom of bore 32. Cap member 36 comprises a port 40 and a bleeding orifice 42 which port and orifice open into a cylindrical chamber 46 provided in the interior of cap member 36 in front of bore 32. Port 40 is connected to the braking system (not shown) and orifice 42 is closed by means of a bleeding plug.

Two friction linings 50 and 52 adapted to be brought into contact with each side of disc 16 are connected by any suitable means to two pads 54 and 56 slidably mounted in corresponding recesses provided in the reinforced arms 12 and 14 of support 10.

Pad 54 is affixed to the portion 58 of stirrup 26 located on the left side of the disc (as viewed in FIG. 2) and pad 56 is affixed to a plate 60 forming a part of the device which will be described hereinafter.

A diaphragm 62 made of elastomeric material is located in chamber 46. This diaphragm 62 is clamped between an annular shoulder 64 provided in said chamber 46 and an annular flange 66 formed on portion 34 of stirrup 26 on the periphery of the stepped bore 32, thus providing a tight resilient connection between the two chambers 32 and 46. A circular plate 68 closely adjacent to diaphragm 62 is slidably mounted in an annular recess 70 provided in bore or chamber 32. A cylindrical sleeve 72, the inner surface of which is threaded, is movable in chamber 32. This sleeve 72 is normally in abutment against plate 68. A screw 74 provided with a collar 76 and an axial projection 78 is threadedly mounted in sleeve 72. Projection 78 comprises a head 82 of non-circular configuration which is adapted to slide in a corresponding opening provided in plate 60 and in a registering opening provided in a reinforcing plate 80 solid with plate 60, such a mounting permitting to avoid the rotation of screw 74 with respect to pad 56.

As shown more in detail in FIGURE 3, a cage 86 is located around the end of sleeve 72 which is adjacent to plate 68, said cage 86 being free to rotate in an annular recess 84 provided in chamber 32 adjacent to annular recess 70. Cage 86 comprises slots 90 provided with inclined ramps 92. In slots 90 are located balls 88 which, when the cage 86 is moved in a direction corresponding to a rotation indicated on the drawing by arrow $f$, are clamped between the inclined ramps 92 and the outer surface of sleeve 72 in order to bring the latter in rotation together with cage 86. These balls 88 and slots 90 define thereby a free wheel connection between the cage 86 and the sleeve 72. A slot 94 provided in cage 86 is engaged by a stud 96 affixed to plate 68, a recess 98 provided in the surface of the annular recess 84 being provided to permit a free axial movement of stud 96 toward the interior of chamber 32. As shown more in detail in FIGURE 4, stud 96 solid with plate 68 is provided with an inclined ramp 100 which upon axial movement of plate 68 toward the brake disc 16 brings in rotation cage 86 through the intermediary of slot 94.

A helical torsion spring 102 is located in chamber 32 around sleeve 72. One of the ends of said spring is inserted into a hole 104 provided in cage 86, the other end of the spring being maintained in a hole 106 provided in the bottom of chamber 32 of the stirrup 26. Torsion spring 102 urges the cage in rotation in the direction shown by arrow $f$ which corresponds to the clutching of the free-wheel.

An annular member 108 is rotatably mounted on the axial projection 76 of screw 74 between the collar 76 and the reinforcing plate 80. The annular member 108 is biased in rotation by a control lever 110 (FIGURE 5) secured thereto and actuated by a cable connection 112 connected to the hand brake of the vehicle.

As shown more particularly in FIGURES 4 and 5, the annular member 108 comprises on each of its faces a plurality of biconical recesses 114. Two sets of balls 116 and 118 are located between the recesses 114 and circular grooves 120 and 122 provided in collar 76 and reinforcing plate 80 respectively. An annular holding plate 124 is provided for each set of balls 116 and 118 to maintain the latter in place and to avoid any undesirable jamming thereof. Upon actuation of the hand brake, the annular member 108 rotates through a given angle. Balls 116 and 118 are thus caused to roll in the recesses 114 and thereby tending to move away from the median plane of the annular member 108. The balls cause collar 76 to axially move away from the reinforcing plate 80 which results in an axial motion of the portion 34 of the stirrup away from pad 56. The two friction linings 50 and 52 thus clamp the disc and the brake is applied for parking braking for instance.

A flexible boot 126 is tightly connected to the reinforcing plate 80 and to portion 34 of the stirrup 26. An opening 130 is provided in the boot 128 to provide the passage of the control lever 110 secured to an annular member 108, the edges of the opening being in tight engagement with said control lever 110.

In operation, fluid under pressure is introduced through port 40 into chamber 46 between the diaphragm 62 and the cap member 36 of the stirrup 26. The fluid under pressure acts simultaneously on the bottom of chamber 46 and on the diaphragm 62. Lining 50 solid with the stirrup is applied upon disc 16 and diaphragm 62 urges plate 68 toward the interior of chamber 62. Sleeve 72 which is maintained in abutment against plate 68 causes screw 74 (to which it is connected through the intermediary of a non-reversible threaded connection) to move toward disc 16. Through the intermediary of collar 76 and of the hand brake annular member 108, screw 74 thrusts against reinforcing plate 80 to urge the latter toward the disc 16 thereby causing lining 52 to be applied against the disc 16 which is thus clamped between the linings 50 and 52. Simultaneously, stud 96 solid with plate 68 moves toward the interior of slot 94 of cage 86 of the free wheel and thus causes cage 86 to move in a direction opposite to the one indicated by arrow $f$, and corresponding to the de-clutching of the free-wheel. Spring 102 is biased in rotation and submitted to a return torque. Sleeve 62 is simply submitted to a translatory motion parallel to the axis since the free-wheel is de-clutched and the friction effects in the threaded connection between the sleeve and the screw are too high to permit a relative rotation of these two elements due to the stresses caused by the application of the brake.

The brake being in its released position, the friction effects between screw 74 and sleeve 72 are substantially reduced and stud 96 is disengaged from slot 94, torsion spring 102 which has been biased or loaded upon application of the brake urges cage 86 in the direction designated by arrow $f$ which corresponds to the clutching of the free-wheel. Consequently, sleeve 72 rotates so as to unscrew from screw 74 which is maintained against any rotation on pad 56. It results therefrom a movement of pad 56 which is in abutment on screw 74 away from the stirrup which carries pad 54. This relative movement between pad 56 and stirrup is transmitted to the linings which come closer to the disc of a value which is a function of the wear resulting from successive applications of the brake.

What I claim is:

1. In a brake, a housing member, a brake applying member non-rotatably mounted in said housing member, a screw-and-nut assembly located in said housing between said brake applying member and a friction means actuated by the latter, a one-way coupling unit having a cage located in said housing member and operatively connected to said screw-and-nut assembly for unscrewing same, a one-way driving connection between said cage and said brake applying member, a torsion spring respectively anchored at its ends to said housing member and to said cage respectively, said one way driving connection being arranged to stress said spring upon application of said brake in a direction corresponding to the de-clutching of said one-way coupling unit.

2. In a brake, a housing member, a bore in said housing member, a friction means, a plunger assembly mounted in said bore for slidable movement relative to said housing member for actuating said friction means in a brake applying direction and in a return direction said plunger assembly including a non-rotatable brake applying member and a screw-and-nut assembly located between said brake applying member and said friction means, said screw-and-nut assembly having one element non-rotatably connected to said friction means and the other element threadedly connected to said one element and operative to be in abutment against said brake applying member, a cage member rotatably but non-slidably mounted in said bore of said housing member and operatively connected to said other element by a one-way coupling which is locked in a rotational direction corresponding to unscrewing of the screw-and-nut assembly, a torsion spring having one end anchored to said housing member and the other end anchored to said cage member, said torsion spring being stressed to bias said cage in said rotational direction and a one-way driving connection provided between said cage and said brake applying member and arranged relative to said cage to impart thereon a rotational force in a direction opposite to said rotational direction upon brake applying movement of said plunger assembly.

3. The structure as recited in claim 1 wherein said one-way driving connection is comprised of a slot in said cage, which slot engages a stud formed with an inclined ramp and secured to the brake applying member.

4. The structure as recited in claim 1 further comprising a brake actuating means located between said friction means and said screw-and-nut assembly and adapted to spread said friction means away from screw-and-nut assembly upon actuation to thereby apply the brake.

5. The structure as recited in claim 4 wherein said brake actuating means comprise a lever controlling the rotation of an annular element rotatably mounted on said screw-and-nut assembly and two sets of balls located in biconical recesses formed on each face of said annular element and in circular grooves provided on said friction means and on said screw-and-nut assembly respectively.

6. The structure as recited in claim 1, wherein said cage is annular and is formed on its inner edge with slots encompassing balls in contact with said screw-and-nut assembly, said slots being provided with circumferentially inclined ramps whereby said balls are clamped between said cage and the rotatable element of said screw-and-nut assembly upon rotation of said cage under the action of said torsion spring.

7. The structure as recited in claim 1 wherein said brake applying member comprises a diaphragm of visco-elastomeric material, one face of which is submitted to the fluid braking pressure and the other face of which is in abutment against a non-rotatable circular plate bearing on said screw-and-nut assembly.

References Cited

UNITED STATES PATENTS

| | | | |
|---|---|---|---|
| 2,173,577 | 9/1939 | Clench | 188—79.5 |
| 3,115,217 | 12/1963 | Butler | 188—196 X |
| 3,266,602 | 8/1966 | Belart et al. | 188—73 |

DUANE A. REGER, *Primary Examiner.*